Patented Dec. 16, 1952

2,622,005

UNITED STATES PATENT OFFICE 2,622,005

METHOD FOR CHLORINATING TITANIFEROUS MATERIAL

Leif Aagaard, Plainfield, and Sandford S. Cole, Metuchen, N. J., assignors to National Lead Company, New York, N. Y., a corporation of New Jersey No Drawing. Application April 5, 1951, Serial No. 219,511

5 Claims. (Cl. 23—87)

This invention relates to a method for chlorinating titaniferous materials. More specifically it relates to the chlorination of the titanium values in titaniferous materials containing magnesium and calcium compounds.

Many types of titaniferous materials have been chlorinated by prior processes. They include tataniferous ores, such as rutile ore, titaniferous iron ores such as ilmenite ore, and titanium slags and concentrates. These materials contain many constituents other than titanium, some of which do not affect the chlorination of the titanium values, while others when present prevent or hinder the chlorination operation. Among the latter constituents are compounds of calcium and magnesium. These particular elements when present in the titanium material apparently block the chlorination reaction by forming calcium and magnesium chlorides which coat the particles and stop the chlorination reaction from proceeding in the normal manner.

An object of the present invention, therefore, is to provide a method for chlorinating titanium values from titaniferous materials containing compounds of calcium and magnesium. Another object is to provide a method which is economical and easy to employ. A further object is to provide a process for chlorinating titanium values from titaniferous material containing compounds and calcium and magnesium which will produce a substantially complete chlorination of the titanium values. These and other objects will become apparent from the following more complete description of the present invention.

In its broadest aspects this invention contemplates a process for chlorinating the titanium values from titaniferous material containing a compound selected from the group of metals consisting of calcium and magnesium which comprises admixing titanium phosphate and said titaniferous material and chlorinating the titanium values in said mixture at elevated temperature in the presence of a carbonaceous reducing agent to form titanium tetrachloride and phosphate of said metal, whereby said titanium tetrachloride is separated from said phosphate of said metal by volatilization. By this process the phosphates of calcium and magnesium are formed during the chlorination step instead of forming calcium and magnesium chlorides, the presence of which is detrimental to the chlorination of the titanium values.

Another method which employs other phosphate compounds in chlorinating titaniferous materials is described and claimed in co-pending application Serial No. 219,512, filed April 5, 1951.

It has been found that the titanium values in the titaniferous material may be satisfactorily chlorinated if the amount of phosphate added is equivalent to at least 50% of the amount required to react with all of the calcium and magnesium compounds present in the titaniferous material. For best results however stoichiometric amounts are preferred. It has been found that pyrophosphates of both calcium and magnesium are generally formed.

The titaniferous material, the titanium phosphate and the carbonaceous reducing agent may be intimately mixed and chlorinated by almost any known chlorination process. The mixture may be formed into nodule or briquettes and chlorinated by passing chlorine gas therethrough. Or the mixture in finely divided form may be chlorinated by known procedures. A preferred embodiment of the present invention is to chlorinate the titanium material in a "fluo-solids" operation in which the titanium values are suspended in the presence of carbon in a fluidized restraining bed. Chlorine gas is added through the bottom of said bed to suspend and react with the titanium values. In this preferred embodiment the titanium phosphate is added to the mixture in the restraining bed and apparently the phosphate ions react with the magnesium and calcium compounds to form calcium and magnesium phosphates. The presence of phosphates of magnesium and calcium apparently does not hinder the chlorination of the titanium values and subsequently the chlorination of titanium proceeds in an unhampered manner.

The calcium and magnesium constitutents in the titaniferous material are present as various types of compounds such as e. g. titanates, silicates and compositions with other constituents present in the titaniferous material. Apparently these compounds are normally simultaneously chlorinated along with the titanium dioxide values in the titaniferous material and therefore must form calcium and magnesium chlorides which coat the particles of $TiO_2$ and therefore block the reaction $TiO_2 + 2Cl_2 \rightarrow TiCl_4$, from taking place. However, when the chlorination of $TiO_2$ in the titaniferous material containing calcium and magnesium compounds is carried out in the presence of titanium phosphate, the calcium and magnesium constituents in the titaniferous material apparently form phosphates and do not inhibit the chlorination of the titanium values.

Example 1

A titanium slag containing calcium and magnesium compounds was used in this example. It had the following analysis:

| | Per cent |
|---|---|
| TiO₂ | 67.1 |
| FeO | 3.7 |
| MgO | 4.5 |
| CaO | 9.5 |
| Al₂O₃ | 8.0 |
| SiO₂ | 7.2 |

The slag was ground to obtain a particle size range from 40 to 200 mesh. 400 parts of this slag were admixed with 140 parts of titanium phosphate and 100 parts of carbon. The mixture was then placed in a vertical tube furnace. 6.2 parts per minute of chlorine gas and 3.2 parts per minute of $CO_2$ gas were added to the bottom of said tube and allowed to pass up through the $TiO_2$ and carbon mixture. The mixture was heated externally to a temperature of 850° C. The velocity of the gases was sufficient to suspend the material thus forming a restraining bed of the mixture. The amount of phosphate added as titanium phosphate was sufficient to theoretically react with all of the calcium and magnesium compounds to form calcium and magnesium phosphate. The reaction was continued for 4 hours. The temperature of chlorination was held between 800° C. and 850° C. 84% of the titanium values was converted to titanium tetrachloride with 90% utilization of the chlorine. No sintering or sticking of the particles in the restraining bed occurred. The bed maintained its dynamic suspension throughout the entire run.

Example 2

The titanium phosphate used in this example was prepared by reacting a portion of the slag described in Example 1 with phosphoric acid. 100 parts of slag were mixed with 135 milliliters of 85% phosphoric acid. The amount of phosphoric acid used was equivalent to the theoretical amount necessary to react with all of the calcium and magnesium compounds plus sufficient to form titanium phosphate with the titanium values present in the slag. The mixture was thoroughly agitated to form a uniform slurry. The slurry was then boiled for 60 minutes in order to complete the reaction. The mass was dried and calcined at 800° C. for one hour in order to substantially completely dehydrate the titanium phosphate formed. The calcined mass was then ground to obtain a particle size range from 40 to 200 mesh.

165 parts of the titanium phosphate mixture obtained from reaction of the slag with $H_3PO_4$ were admixed with 400 parts of slag and 100 parts of carbon and placed in the vertical tube furnace. The amount of titanium phosphate mixture used was equivalent to that required to react with all of the calcium and magnesium compounds in the slag. The chlorination of the titanium values was carried out according to the process described in Example 1.

82% of the titanium values was converted to titanium tetrachloride with 90% utilization of the chlorine. Substantially identical results were obtained in this example by using a titanium phosphate prepared by reacting phosphoric acid with a portion of the slag instead of using a titanium phosphate prepared from another type of titanium raw material.

In order to show the effectiveness of the process of this invention, i. e. chlorinating titanium values in the presence of titanium phosphate, a control run was made by chlorinating a titanium material containing calcium and magnesium compounds, without employing titanium phosphate. The control run was carried out as follows:

The procedure described in Example 1 was used for this run. 400 parts of the same slag were admixed with 100 parts of carbon and placed in a vertical tube furnace. 6.2 parts per minute of chlorine gas and 3.2 parts per minute of $CO_2$ gas were added to the bottom of the tube and allowed to pass up through the suspended bed. The bed was heated to 850° C. and the gases were passed through the bed for 2 hours. At the end of 2 hours 22% of the titanium values had been converted to titanium tetrachloride with only 54% utilization of the chlorine. The suspended bed formed a sticky and gummy mass in the tube furnace and apparently the calcium and magnesium constituents were also chlorinated and the chlorides of calcium and magnesium formed a coating over the titanium values which prevented further chlorination of the titanium values.

By comparing the results of the examples with that of the control run, it has clearly been shown that titanium values in titaniferous material containing calcium and magnesium compounds may be chlorinated efficiently and directly by the process of this invention. Apparently the titanium phosphate present during the chlorination of the titanium material reacts with the calcium and magnesium compounds to form calcium and magnesium phosphates which are not chlorinated during the chlorination of the titanium values. By the process of this invention high yields of titanium tetrachloride may be obtained directly without processing difficulties.

While this invention has been described and illustrated by the examples shown, it is not intended to be strictly limited thereto and other modifications and variations may be employed within the scope of the following claims.

We claim:

1. A method for chlorinating the titanium values from titaniferous material containing a compound of a metal selected from a group consisting of calcium and magnesium which comprises mixing titanium phosphate and said titaniferous material to form a dry mixture and chlorinating said mixture at elevated temperature in the presence of a carbonaceous reducing agent to form titanium tetrachloride and phosphate of said metal, whereby said titanium tetrachloride is separated from said phosphate by volatilization.

2. Method according to claim 1 in which the amount of titanium phosphate admixed with said titaniferous material is equivalent to at least 50% of the stoichiometric amount required to form phosphate of said metal present in said titaniferous material.

3. Method according to claim 1 in which the amount of titanium phosphate admixed with said titaniferous material is substantially equal to the stoichiometric amount required to form phosphate of said metal present in said titaniferous material.

4. Method for chlorinating the titanium values from titaniferous material containing a calcium compound which comprises mixing titanium phosphate and said titaniferous material to form a dry mixture and chlorinating said mixture in the presence of a carbonaceous reducing agent to form titanium tetrachloride and calcium phosphate.

5. A method for chlorinating the titanium values from a titaniferous material containing a magnesium compound which comprises mixing titanium phosphate and said titaniferous material to form a dry mixture and chlorinating said mixture in the presence of a carbonaceous reducing agent to form titanium tetrachloride and magnesium phosphate.

LEIF AAGAARD.
SANDFORD S. COLE.

REFERENCES CITED

The following references are of record in the file of this patent:

UNITED STATES PATENTS

| Number | Name | Date |
|---|---|---|
| 2,154,130 | Kingsbury et al. | Apr. 11, 1939 |